(12) United States Patent
Park et al.

(10) Patent No.: US 7,515,902 B2
(45) Date of Patent: Apr. 7, 2009

(54) VELOCITY ESTIMATION APPARATUS IN MOBILE COMMUNICATION ENVIRONMENTS

(75) Inventors: Goo-Hyun Park, Seoul (KR); Dae-Sik Hong, Seoul (KR); Ye-Hoon Lee, Suwon-si (KR); Eung-Sun Kim, Suwon-si (KR); Myeon-Gyun Cho, Seongnam-si (KR); Jong-Hyeuk Lee, Seongnam-si (KR)

(73) Assignees: Samsung Electronics Co., Ltd (KR); Yonsei University (KR)

( * ) Notice: Subject to any disclaimer, the term of this patent is extended or adjusted under 35 U.S.C. 154(b) by 456 days.

(21) Appl. No.: 11/143,074

(22) Filed: Jun. 2, 2005

(65) Prior Publication Data

US 2005/0282499 A1    Dec. 22, 2005

(30) Foreign Application Priority Data

Jun. 4, 2004    (KR) ............... 10-2004-0040773

(51) Int. Cl.
 *H04Q 7/20* (2006.01)
(52) U.S. Cl. ............. 455/411; 455/440; 455/438; 455/67.16; 455/238.1; 342/104; 342/114
(58) Field of Classification Search ......... 455/440, 455/441, 438, 67.16, 238.1; 342/104, 114
See application file for complete search history.

(56) References Cited

U.S. PATENT DOCUMENTS 6,564,042 B1 * 5/2003 Jou et al. ............. 455/238.1
6,862,457 B1 * 3/2005 Sarkar et al. ............ 455/522
6,904,550 B2 * 6/2005 Sibecas et al. .......... 714/714
6,987,971 B2 * 1/2006 Kirsch ................. 455/441
7,167,456 B2 * 1/2007 Iwamatsu et al. ........ 370/321
2003/0045319 A1 * 3/2003 Sarkar et al. ........... 455/522

FOREIGN PATENT DOCUMENTS

KR    1020040100447    12/2004
KR    1020050027683    3/2005
KR    1020050113468    12/2005
WO    WO 03/079570     9/2003

OTHER PUBLICATIONS

Goo-Hyun Park et al., "A Modified Covariance-Based Velocity Estimation Method for Rician Fading Channel", Vehicular Technology Conference, May 2004.

* cited by examiner

*Primary Examiner*—Lana N Le
*Assistant Examiner*—Ping Y Hsieh
(74) *Attorney, Agent, or Firm*—The Farrell Law Firm, PC (57) ABSTRACT

Disclosed is a method for estimating the velocity of a mobile station in Rician fading environments in which a direct wave exists. Cellular mobile communication environments include two environments, Rician fading environments in which a direct wave exists and Rayleigh fading environments in which a direct wave does not exist. Generally, many methods for estimating the velocity of a mobile station have been known in Rayleigh fading environments. However, in Rician fading environments in which a direct wave exists, many errors occurs in estimating the velocity of a mobile station due to difficulty in estimation of a Rician coefficient K and an incident angle $\theta_0$. According to the invention, a method is provided wherein error is mostly eliminated in estimating the velocity of a mobile station by obtaining a maximum Doppler frequency of the mobile station, even without directly obtaining a Rician coefficient K and an incident angle $\theta_0$.

10 Claims, 8 Drawing Sheets

VELOCITY ESTIMATION APPARATUS IN MOBILE COMMUNICATION ENVIRONMENTS

PRIORITY

This application claims priority to an application entitled "Velocity Estimation Apparatus in Mobile Communication Environments" filed in the Korean Intellectual Property Office on Jun. 4, 2004 and assigned Serial No. 2004-40773, the contents of which are hereby incorporated by reference.

BACKGROUND OF THE INVENTION

1. Field of the Invention

The present invention relates to a mobile communication system, and more particularly to an apparatus and a method for estimating the velocity of a mobile station in Rician fading environments in which a direct wave exists.

2. Description of the Related Art

In the next generation wireless communication, a system resource allocation based on exact channel information plays an important role in supporting a large quantity of multimedia packet service in restricted frequencies and channel resources.

In a time-varying channel such as a mobile communication channel, velocity information is very important information for a channel. The velocity information is information representing channel states of a user, which is an inevitable necessity for efficiently managing system resources.

Conventionally, many adaptive algorithms use velocity information of a mobile station in determining the coefficient (e.g., channel tracker length and interleaver size) of an adaptive receiver in mobile communication environments. In particular, velocity information is very important information in processing power control signals for controlling power in order to solve a near-far problem and handoffs occurring when a mobile station passes through a boundary between cells.

A mobile station experiences a Doppler shift according to its own movement. The Doppler shift generates a frequency error of a received signal in proportion to a movement velocity of the mobile station for a base station.

Accordingly, it is possible to estimate the velocity of the mobile station using a characteristic in which the frequency error of the received signal due to the Doppler shift is proportional to the movement velocity of the mobile station as described above. That is, the velocity of the mobile station may be estimated by detecting a maximum Doppler frequency of the received signal in a mobile communication system.

Estimation of a maximum Doppler frequency has a large role in estimating a channel coefficient. Various algorithms used for estimating the maximum Doppler frequency are presently known.

A conventional method for estimating the maximum Doppler frequency includes a method for inducing a Level Crossing Rate (LCR) characteristic and a Zero Crossing Rate (ZCR) characteristic of a random signal, a method using an autocorrelation function (ACF) value of a received signal, and a method using covariance (COV) of a square value for a magnitude of a received signal.

The conventional technology may obtain a precisely estimated velocity value in Rayleigh fading environments in which direct waves do not exist. However, the conventional technology may exactly estimate the velocity of a mobile station only by using a Rician coefficient K, which represents a power ratio of a direct wave component and a scattered wave component, and information for an incident angle $\theta_0$ of a direct wave in Rician fading environments in which the direct waves exist.

A method for estimating the Rician coefficient K is already well known. However, a method for estimating the information for the incident angle $\theta_0$ of the direct wave is not yet known in a system using a single antenna.

Accordingly, it is difficult to apply the conventional technology to the Rician fading environments in which the direct waves exist such as mobile communication environments.

Generally, when the conventional technology is applied without considering the direct wave, a method using an LCR value or a COV value is tolerant to the Rician fading environments in which the direct waves exist, as compared with a method using a ZCR value or an ACF value. However, because the method using the LCR value or the COV value does not consider the direct wave, very serious problem may occur in that error due to the direct waves reaches 20% to 40% of an estimated value.

In order to compensate for this disadvantage, a method has been proposed, which uses a coefficient of an Auto-Regressive (AR) model of a fading channel. The method using the coefficient of the AR model shows little error in the Rician fading environments, but it still has an error of about 20% with respect to a specific incident angle. Further, a process of estimating the coefficient of the AR model is sensitive to additive noise.

SUMMARY OF THE INVENTION

Accordingly, the present invention has been made to solve the above-mentioned problems occurring in the prior art. It is an object of the present invention to provide a method and an apparatus for efficient velocity estimation. The velocity estimate is tolerant to noise and can estimate a maximum Doppler frequency without information about a direct wave component in Rician fading environments in which the direct wave exists.

It is another object of the present invention to provide a method for estimating incident angle information of a direct wave for a received signal in a mobile station using a single antenna.

In order to accomplish the aforementioned object, according to one aspect of the present, there is provided a maximum Doppler frequency estimation method, the method including the steps of performing an auto-covariance operation having a predetermined time difference for a received pilot signal; performing an auto-covariance operation without a time difference for the received pilot signal; performing an auto-covariance operation without a time difference for a square value of the received pilot signal; performing an auto-covariance operation having a predetermined time difference for the square value of the received pilot signal; and estimating a maximum Doppler frequency by means of signals output from each step.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

A preferred embodiment of the present invention will be described in detail herein below with reference to the accompanying drawings.

Figure 1:
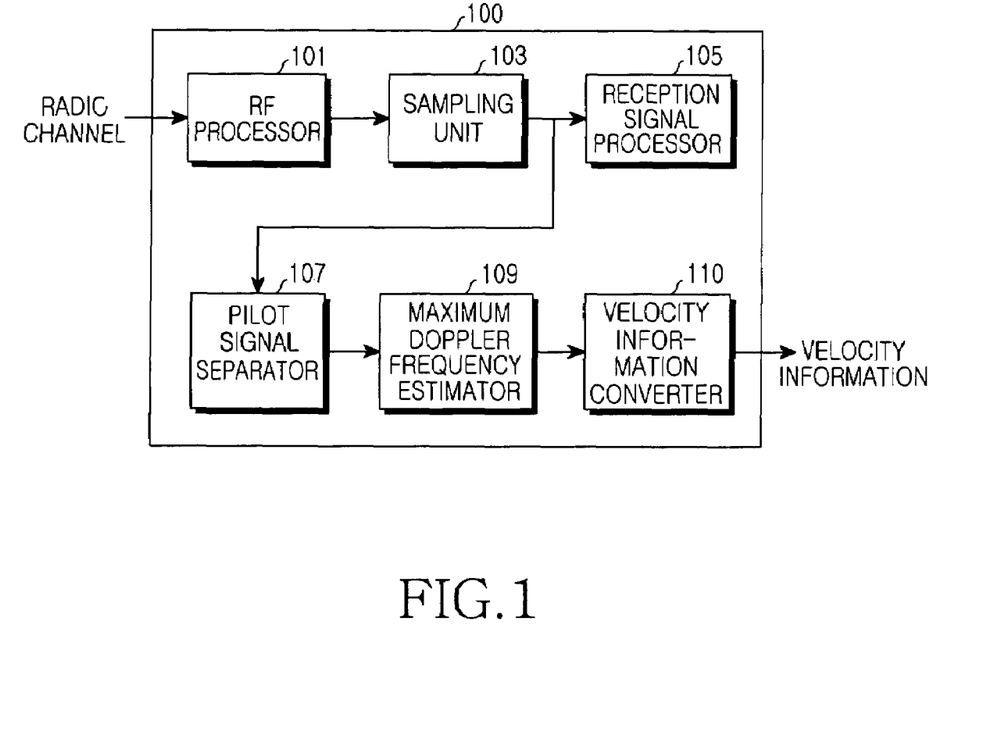
FIG. 1 is a block diagram of a velocity estimation apparatus according to the present invention.

Referring to FIG. 1, the velocity estimation apparatus 100 includes a Radio Frequency (RF) processor 101 for converting signals received through a predetermined radio channel into baseband signals, a sampling unit 103 for converting the baseband signals into data signals, a pilot signal separator 107 for separating pilot signals from the data signals, a maximum Doppler frequency estimator 109 for estimating a maximum Doppler frequency from the pilot signals, and a velocity information converter 110 for converting information for the estimated maximum Doppler frequency into velocity information.

Figure 2:
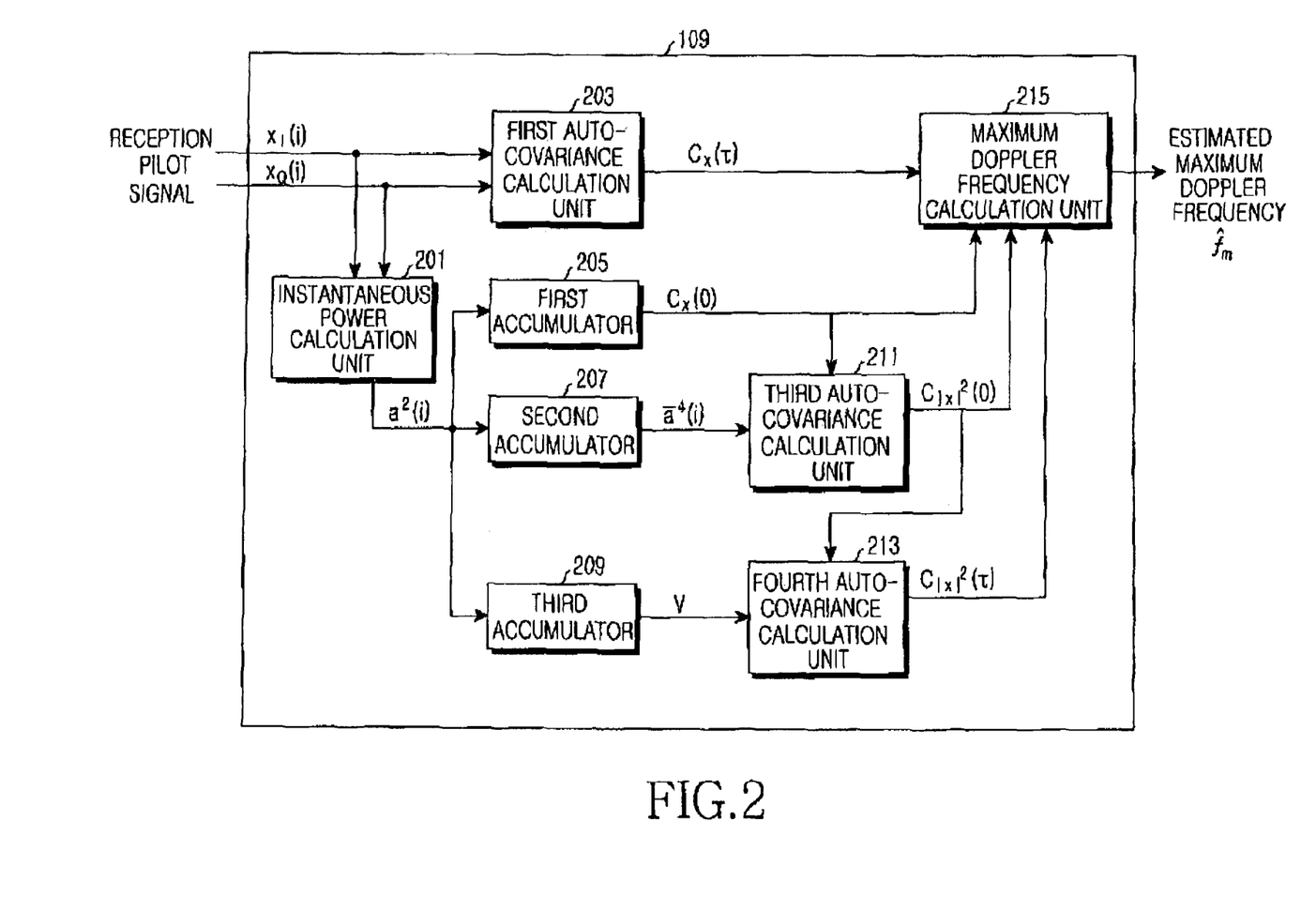
FIG. 2 is a block diagram illustrating a maximum Doppler frequency estimation method according to an embodiment of the present invention.

As illustrated in FIG. 2, the maximum Doppler frequency estimator 109 includes a first auto-covariance unit for performing an auto-covariance operation having a predetermined time difference for the pilot signal output from the pilot signal separator 107 of FIG. 1, a second auto-covariance unit for performing an auto-covariance operation without time difference for the pilot signal, a third auto-covariance unit for performing an auto-covariance operation without time difference for a square value of the pilot signal, a fourth auto-covariance unit for performing an auto-covariance operation having a predetermined time difference for the square value of the pilot signal, and a maximum Doppler frequency calculation unit 215 for calculating a maximum Doppler frequency of the pilot signal by means of output values from the auto-covariance units.

The first auto-covariance unit includes a first auto-covariance calculation unit 203 which performs the auto-covariance operation having the predetermined time difference for the pilot signal and outputs a first auto-covariance value.

The second auto-covariance unit includes an instantaneous power calculation unit 201 for calculating instantaneous power of the pilot signal, and a first accumulator 205 for accumulating an output value of the instantaneous power calculation unit 201 by a predetermined number of times.

The third auto-covariance unit includes the instantaneous power calculation unit 201, a second accumulator 207 for accumulating a square of the output value of the instantaneous power calculation unit 201 by a predetermined number of times, and a third auto-covariance calculation unit 211 for performing the auto-covariance operation for an output value of the second accumulator 207 and an output value of the first accumulator 205 and outputting a third auto-covariance value.

The fourth auto-covariance unit includes the instantaneous power calculation unit 201, a third accumulator 209 for accumulating a value by a predetermined number of times, which is obtained by squaring a difference between the output value of the instantaneous power calculation unit 201 and an output value having predetermined time difference for the output value of the instantaneous power calculation unit 201, and a fourth auto-covariance calculation unit 213 for outputting a fourth auto-covariance value based on an output value of the third accumulator 209 and an output value of the third auto-covariance calculation unit 211.

Generally, in Rayleigh fading environments in which direct waves do not exist, an ACF-based maximum Doppler frequency and a COV-based maximum Doppler frequency may be obtained by means of the following Equations (1) and (2).

$$\frac{\phi_1}{\phi_0} = J_0(2\pi f_m T_S) \tag{1}$$

$$\frac{Cov[\alpha^2(i) + \alpha^2(i+1)]}{Var[\alpha^2(i)]} = J_0^2(2\pi f_m T_S) \tag{2}$$

In Equation (1), $f_m$ represents a maximum Doppler frequency, $T_S$ represents a time period of a pilot signal, and $\Phi_k$ represents an ACF value between received signals having k sampling time intervals between them. In Equation (2), Cov [o] and Var[o] represent a covariance value and an variance value, respectively, and $J_0(\ )$ represents a zero order Bessel function of the first kind. Equations (1) and (2) are results obtained from the Rayleigh fading environments, which may be restructured to the following Equations (3) and (4) in Rician fading environments in which the direct waves exist.

$$\frac{\phi_1}{\phi_0} = \frac{K\cos(2\pi f_m T_S \cos\theta_0) + J_0(2\pi f_m T_S)}{K+1} \tag{3}$$

$$\frac{Cov[\alpha^2(i)\alpha^2(i+1)]}{Var[\alpha^2(i)]} = \frac{2KJ_0(2\pi f_m T_S)\cos(2\pi f_m T_S \cos\theta_0) + J_0^2(2\pi f_m T_S)}{2K+1} \tag{4}$$

Equations (3) and (4) are very complicated equations including a Rician coefficient K, which represents a ratio of a direct wave component and a scattered wave component, and an incident angle $\theta_0$ of a direct wave.

Generally, it is very difficult to estimate information for a direct wave component in rapidly changing fading environments. Accordingly, estimates of a maximum Doppler frequency by means of Equations (1) and (2) generally do not consider the influence of a direct wave. However, because general cellular mobile communication environments are environments in which the direct wave may exist, estimating the maximum Doppler frequency without considering the influence of the direct wave may cause serious error in an estimated value.

The velocity estimation method according to the present invention uses an improved maximum Doppler frequency estimation technique based on a covariance.

In the improved maximum Doppler frequency estimation technique based on the covariance, an auto-covariance function having a time delay τ of a received signal x(t) may be expressed by Equation (5) below.

$$C_x(\tau) = E\{(x(t) - m_{x(t)})(x(t+\tau) - m_{x(t+\tau)})^*\} \tag{5}$$

In Equation (5), x* represents a conjugate complex of X and $m_{x(t)}$ represents a mean value of x(t). When $m_{x(t)}$ is 0, the auto-covariance function is identical to an autocorrelation function. When x(t) has a real value, x(t) is identical to x*(t).

A normalized auto-covariance function of the pilot signal x(t) received in Rician fading environments and a normalized auto-covariance function of $|x(t)|^2$, which is a square of the pilot signal $x(t)$, may be expressed by Equations (6) and (7) below.

$$\frac{C_x(\tau)}{C_x(0)} = \frac{K\cos(2\pi f_m \tau \cos\theta_0) + J_0(2\pi f_m \tau)}{K+1} \quad (6)$$

$$\frac{C_{|x|^2}(\tau)}{C_{|x|^2}(0)} = \frac{2KJ_0(2\pi f_m \tau)\cos(2\pi f_m \tau \cos\theta_0) + J_0(2\pi f_m \tau)}{2K+1} \quad (7)$$

In order to estimate the maximum Doppler frequency by means of Equations (6) and (7), the Rician coefficient K and information for the incident angle $\theta_0$ are required. When Equations (6) and (7) are combined and restructured in order to erase the incident angle $\theta_0$ of the direct wave, an equation independent to the incident angle $\theta_0$ may be induced as expressed by Equation (8) below.

$$\cos(2\pi f_m \tau \cos\theta_0) = \frac{1}{K}\sqrt{\left(\frac{C_x(\tau)+(K+1)}{C_x(0)}\right)^2 - \frac{C_{|x|^2}(\tau)(2K+1)}{C_{|x|^2}(0)}} \quad (8)$$

Equation (8) may be expressed by Equation (9) below by means of an already well-known method of obtaining the Rician coefficient K.

$$K = \frac{c_x^2(0) - c_{|x|^2}(0) - c_x(0)\sqrt{c_x^2(0) - c_{|x|^2}(0)}}{c_{|x|^2}(0)} \quad (9)$$

When Equations (8) and (9) are put into Equation (6), Equation (10) below may be obtained.

$$f_m = \frac{1}{2\pi\tau} J_0^{-1}\left(\frac{c_x(\tau) - \sqrt{c_x^2(\tau) - c_{|x|^2}(\tau)}}{c_x(0) - \sqrt{c_x^2(0) - c_{|x|^2}(0)}}\right) \quad (10)$$

According to the present invention, it can be understood that the maximum Doppler frequency can be estimated with the auto-covariance values of the received pilot signal $x(t)$ even without the Rician coefficient K and the incident angle $\theta_0$ as expressed by Equation (10).

Hereinafter, the maximum Doppler frequency estimator 109 of FIG. 1 will be described in detail with reference to FIG. 2.

First, the maximum Doppler frequency calculation unit 215 may estimate the maximum Doppler frequency only when it knows the first auto-covariance value $c_x(\tau)$, the second auto-covariance value $c_x(0)$, the third auto-covariance value $c_{|x|^2}(0)$, and the fourth auto-covariance value $c_{|x|^2}(\tau)$ because the maximum Doppler frequency is calculated by Equation (10).

Initially, the first auto-covariance value $c_x(\tau)$ may be obtained by the following method.

The first auto-covariance calculation unit 203 may obtain the first auto-covariance value $c_x(\tau)$ by performing an auto-covariance operation having a predetermined time difference for the received pilot signal constructed by a real part $X_I(i)$ and an imaginary part $X_Q(i)$.

Next, the second auto-covariance value $c_x(0)$ may be obtained by the following method.

The instantaneous power calculation unit 201 calculates instantaneous power based on the received pilot signal, and the first accumulator 205 performs an operation of accumulating an instantaneous power value of the received pilot signal by a predetermined number of times, thereby obtaining the second auto-covariance value $c_x(0)$ which is an auto-covariance value without a time difference for the received pilot signal.

Then, the third auto-covariance value $c_{|x|^2}(0)$ may be obtained by the following method.

The instantaneous power calculation unit 201 calculates the instantaneous power based on the received pilot signal, and the second accumulator 207 performs an operation of accumulating a square of the instantaneous power value of the received pilot signal by a predetermined number of times. The third auto-covariance calculation unit 211 performs an operation of calculating the third auto-covariance value based on signals output from the first accumulator 205 and the second accumulator 207, thereby obtaining the third auto-covariance value $c_{|x|^2}(0)$ which is an auto-covariance value without time difference for a square value of the received pilot signal.

Then, the fourth auto-covariance value $c_{|x|^2}(\tau)$ may be obtained by the following method.

The third accumulator 209 performs an operation of accumulating a value by a predetermined number of times, which is obtained by squaring a difference between the instantaneous power value calculated by the instantaneous power calculation unit 201 and a power value having a predetermined time difference for the instantaneous power value. The fourth auto-covariance calculation unit 213 performs an operation of calculating the fourth auto-covariance value based on output values of the third auto-covariance calculation unit 211 and the third accumulator 209, thereby obtaining the fourth auto-covariance value $c_{|x|^2}(\tau)$ which is an auto-covariance value having a predetermined time difference for a square value of the received pilot signal.

Last, the maximum Doppler frequency calculation unit 215 performs an operation of Equation (10) based on the first auto-covariance value, the second auto-covariance value, the third auto-covariance value and the fourth auto-covariance value calculated by each of the calculation units, thereby obtaining the maximum Doppler frequency.

Hereinafter, a case in which a time delay $\tau$ of the received pilot signal is equal to an interval $T_S$ between samples of the received pilot signal will be described in detail according to a first embodiment of the present invention.

As illustrated in FIG. 2, when the received pilot signal constructed by a real part $X_I(i)$ and an imaginary part $X_Q(i)$ is input to the maximum Doppler frequency estimator 109 and the time delay $\tau$ is equal to the interval $T_S$, a method for obtaining the maximum Doppler frequency according to of the present invention may be as expressed by Equation (11).

$$f_m = \frac{1}{2\pi T_S} J_0^{-1}\left(\frac{c_x(1) - \sqrt{c_x^2(1) - c_{|x|^2}(1)}}{c_x(0) - \sqrt{c_x^2(0) - c_{|x|^2}(0)}}\right) \quad (11)$$

Accordingly, it is necessary to know the first auto-covariance value $c_x(1)$, the second auto-covariance value $c_x(0)$, the third auto-covariance value $c_{|x|^2}(0)$ and the fourth auto-covariance value $c_{|x|^2}(1)$ in Equation (11).

Initially, the first auto-covariance value $c_x(1)$ is calculated by the first auto-covariance calculation unit 203 using a method as expressed by Equation (12) below, which is the auto-covariance value having the time difference $T_S$ between the samples of the received pilot signal.

$$c_x(1) = \frac{1}{N-1} \sum_{i=1}^{N-1} x_I(i)x_I(i-1) + x_Q(i)x_Q(i-1) \quad (12)$$

In Equation (12), N represents a preset number of samples for estimation in the system.

Next, the second auto-covariance value $c_x(0)$ is calculated by the following method, which is the auto-covariance value without a time difference for the received pilot signal.

The instantaneous power calculation unit 201 outputs the instantaneous power value $a^2(i)$ of the received pilot signal by means of a method as expressed by Equation (13). The first accumulator 205 performs an operation as expressed by Equation (14), which accumulates the output value $a^2(i)$ as many times as the N samples, thereby obtaining the second auto-covariance value $c_x(0)$.

$$a^2(i) = x_I^2(i) + x_Q^2(i) \quad (13)$$

$$C_x(0) = \sum_{i=0}^{N-1} a^2(i) \quad (14)$$

Then, the third auto-covariance value $c_{|x|^2}(0)$ is calculated by the following method, which is the auto-covariance value without a time difference for the square value of the received pilot signal. The second accumulator 207 performs an operation as expressed by Equation (15), which accumulates the instantaneous power value $a^2(i)$ as many times as the N samples, thereby outputting a square value $\overline{\alpha}^4(i)$ of the instantaneous power. The third auto-covariance calculation unit 211 performs an operation as expressed by Equation (16) by means of the second auto-covariance value $c_x(0)$ output from the first accumulator 205 and the output value $\overline{\alpha}^4(i)$ of the second accumulator 207, thereby obtaining the third auto-covariance value $c_{|x|^2}(0)$.

$$C_x(0) = \sum_{i=0}^{N-1} a^2(i) \quad (15)$$

$$c_{|x|^2}(0) = \alpha^{-4}(i) - |C_x(0)|^2 \quad (16)$$

Then, the fourth auto-covariance value $c_{|x|^2}(1)$ is obtained by the following method, which is the auto-covariance value having the time difference $T_S$ for the square value of the received pilot signal.

The third accumulator 209 accumulates a value by (N-1) times as expressed by Equation (17), which is obtained by squaring difference between the instantaneous power value $a^2(i)$ and an instantaneous power value having the time difference $T_S$ for the instantaneous power value, thereby outputs a signal value V. The fourth auto-covariance calculation unit 213 performs an operation as expressed by Equation (18) by means of the output value $c_{|x|^2}(0)$ of the third auto-covariance calculation unit 211 and the output value V of the third accumulator 209, thereby obtaining the fourth auto-covariance value $c_{|x|^2}(1)$.

$$V = \sum_{i=1}^{N-1} (a^2(i) - a^2(i-1))^2 \quad (17)$$

$$c_{|x|^2}(1) = c_{|x|^2}(0) - \frac{V}{2} \quad (18)$$

Last, the maximum Doppler frequency calculation unit 215 inputs the auto-covariance values $c_x(1)$, $c_x(0)$, $c_{|x|^2}(0)$ and $c_{|x|^2}(1)$, and estimates the maximum Doppler frequency by means of Equation (11).

In this embodiment, the first auto-covariance calculation unit 203 and the third accumulator 209 perform (N-1) time operations in the system, respectively. However, in other embodiments, it is noted that the number of times of operations may change depending on a system to be used.

Figure 3A:
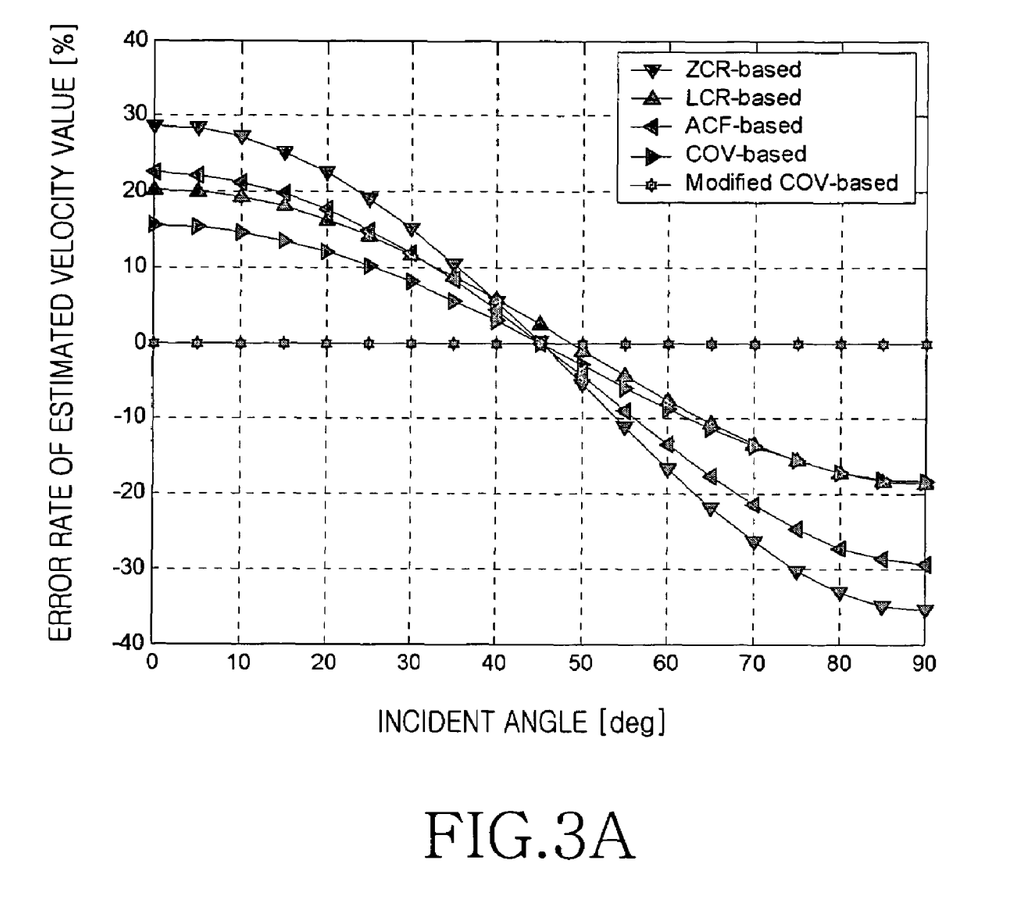
FIG. 3A is a graph showing difference between the prior art and the present invention when a Rician coefficient is 1.0.
Figure 3B:
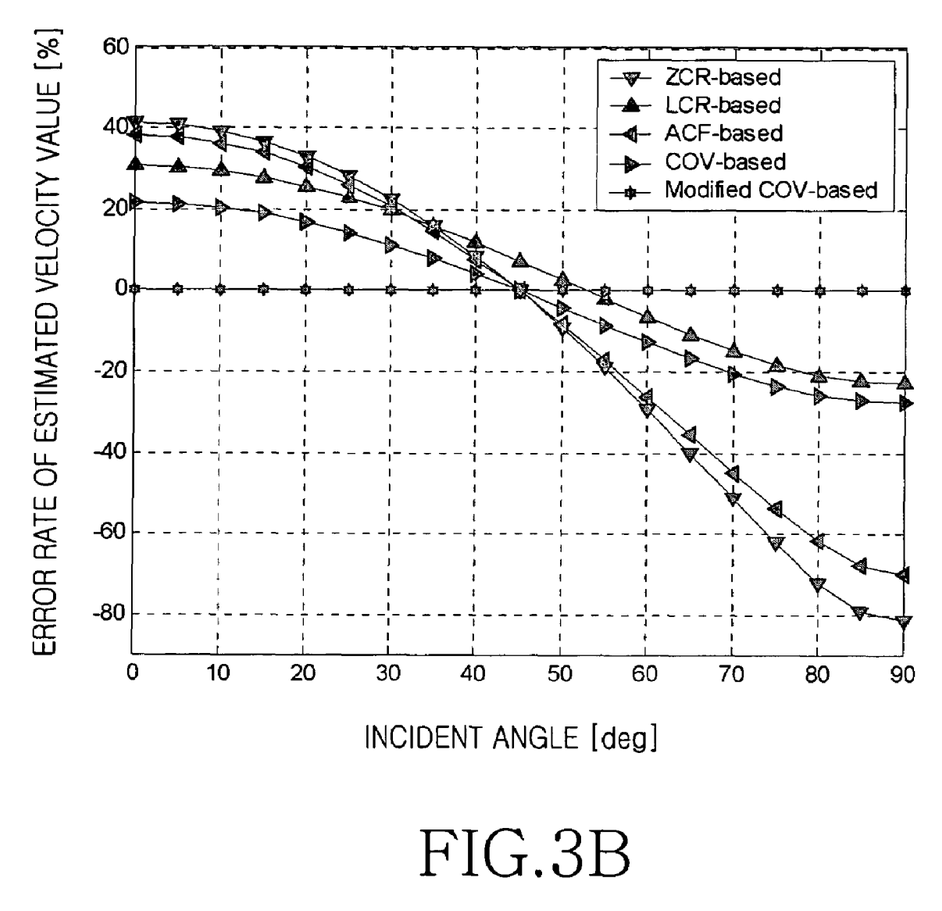
FIG. 3B is a graph showing difference between the prior art and the present invention when a Rician coefficient is 10.0.

FIGS. 3A and 3B are graphs showing results of performance comparison experiments between conventional maximum Doppler frequency estimation methods and a maximum Doppler frequency estimation method of the present invention in Rician fading environments in which Rician coefficients K are 1 or 10.

As illustrated in FIG. 3A, when the Rician coefficient K has been set to 1, estimated mean values according to the conventional maximum Doppler frequency estimation methods based on the ZCR, LCR, ACF and COV has caused a minimum error of +15% and −19% and a maximum error of +30% and −35%. However, the maximum Doppler frequency estimation method using the Modified-COV (M-COV) according to the present invention has not caused any error.

As illustrated in FIG. 3B, even when the Rician coefficient K has been set to 10, estimated mean values according to the conventional maximum Doppler frequency estimation methods based on the ZCR, LCR, ACF and COV has caused a serious minimum error of +20% and −25% and maximum error of 40% and −80%. However, when the M-COV according to the present invention has been used, no error has occurred in the estimated maximum Doppler frequency value.

Figure 4A:
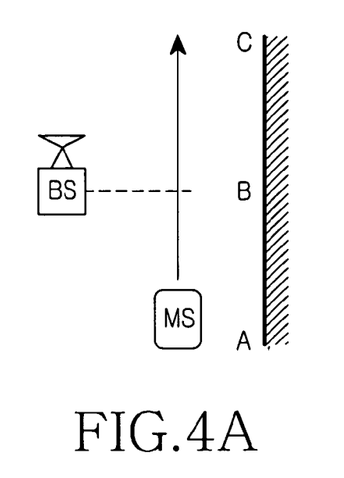
FIGS. 4A to 4C are diagrams illustrating environments according to an embodiment of the present invention.
Figure 4B:
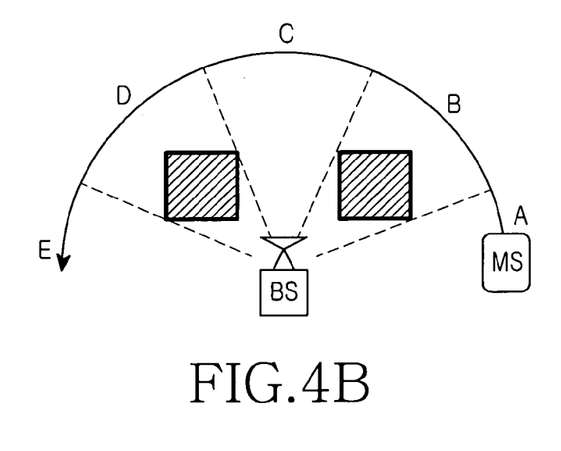
Figure 4C:
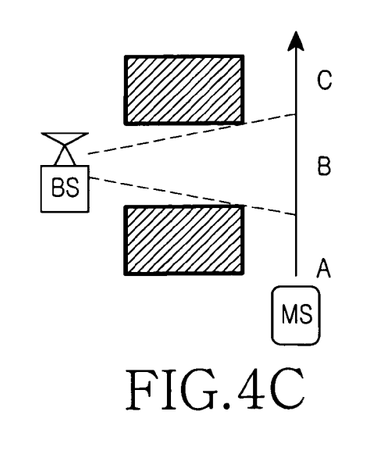

FIGS. 4A and 4C are diagrams illustrating environments in which incident angles and Rician coefficients change for velocity estimation performance experiments of a mobile station, wherein the conventional maximum Doppler frequency estimation methods and the maximum Doppler frequency estimation method of the present invention can be tested.

Simulation experiments have employed a carrier frequency with a 2 GHz band as used in a WCDMA scheme and a pilot symbol transmission rate of 1.5 kbaud corresponding to a slot transmission rate of a 3GPP standard. Herein, one-time maximum Doppler frequency has been updated with a learning rate 0.3.

FIG. 4A shows Rician fading environments considering a case in which the Rician coefficient has been fixed and the incident angle of a direct wave has changed. The incident angle of the direct wave changes from $\pi/6$ to $5\pi/6$ during movement of a mobile station, the Rician coefficient is fixed to 5, and a velocity of the mobile station is 80 km/h.

FIG. 4B shows a case in which the incident angle has been fixed and the Rician coefficient K has changed in the Rician fading environments. In a case of the Rician fading environments in which the direct wave exists, the incident angle was $\pi/2$, the Rician coefficient K has been fixed to 5 when the direct wave exists or 0 when the direct wave does not exist, and the velocity of the mobile station was 80 km/h as in the case of FIG. 4A.

FIG. 4C shows a case in which the Rician coefficient K and the incident angle have changed simultaneously. Herein, the change of the Rician coefficient is consistent with the change in FIG. 4B, and the change of the incident angle is consistent with the change in FIG. 4B.

Figure 5A:
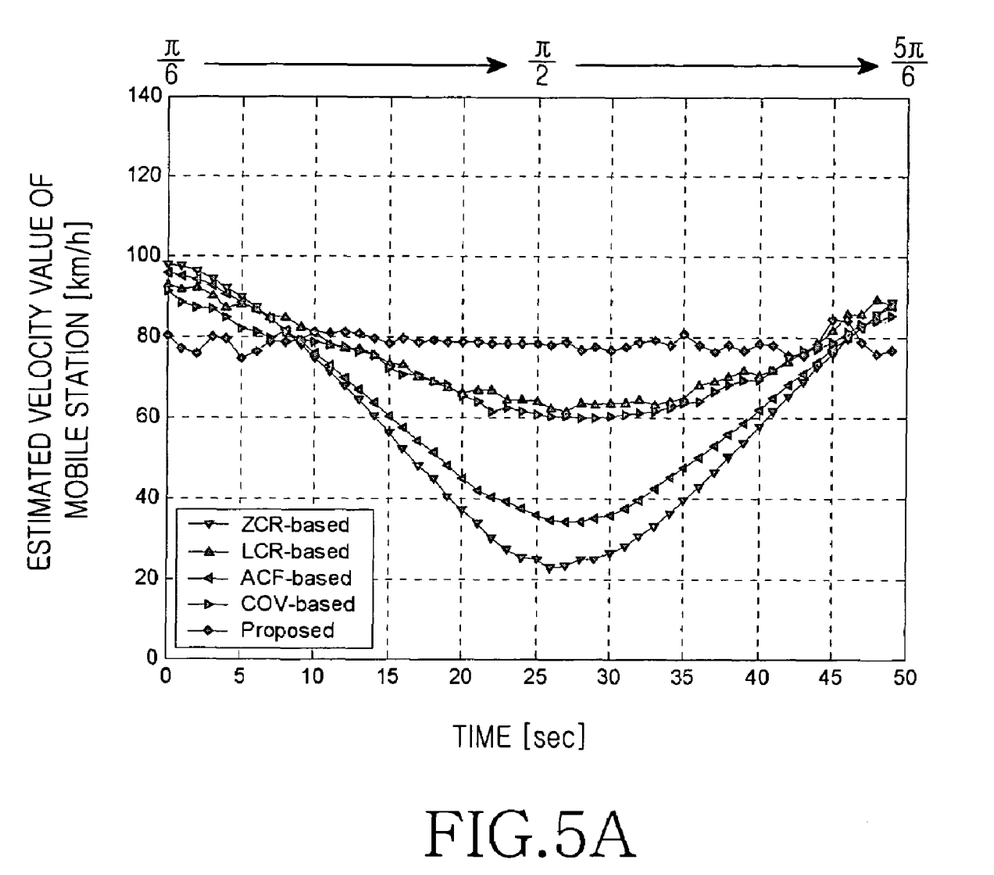
FIGS. 5A to 5C are graphs illustrating results of FIGS. 4A to 4C.
Figure 5B:
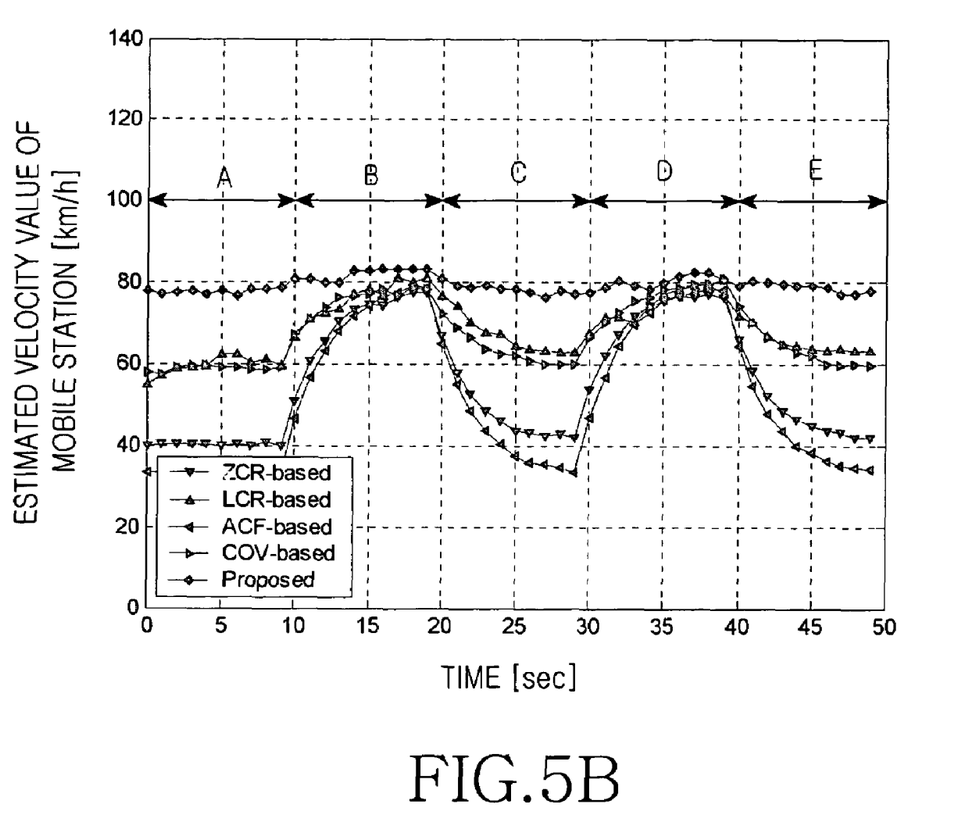
Figure 5C:
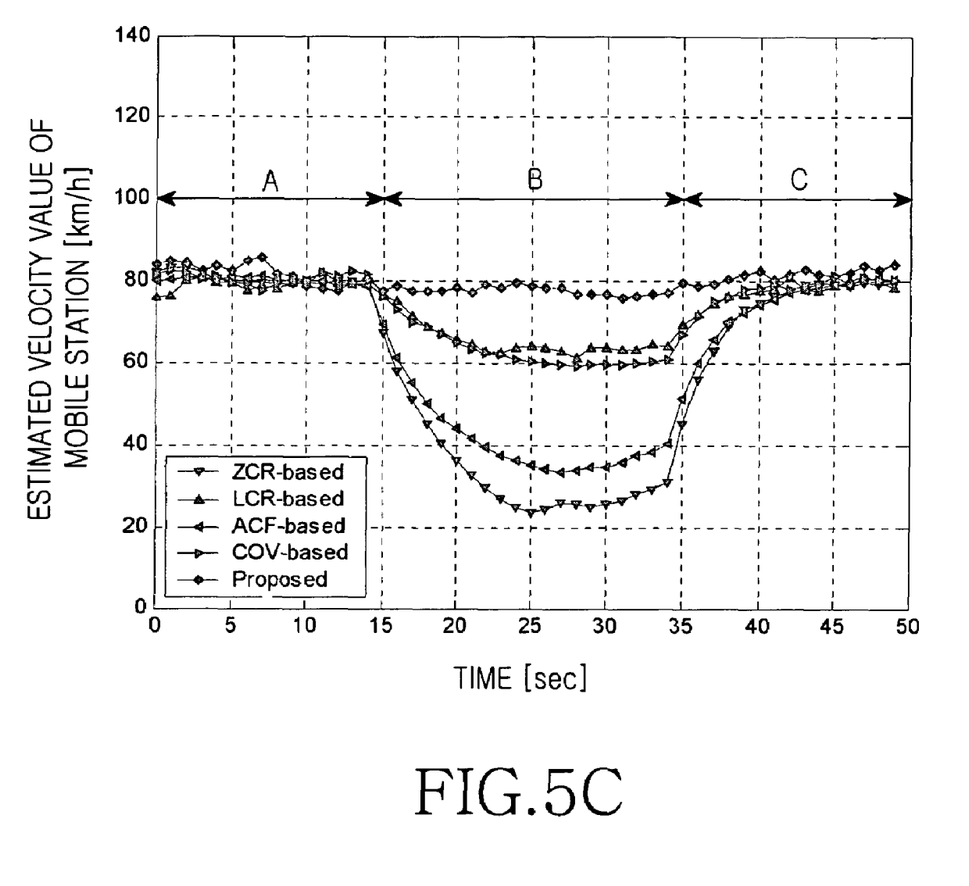

FIGS. 5A and 5C are graphs showing results of the simulation experiments in the environments of FIGS. 4A and 4C.

FIG. 5A shows the result of the simulation experiment of FIG. 4A. In the simulation experiment, measurement time is 50 seconds. There exist only Rician fading environments in which the direct wave exists as illustrated in FIG. 4A. As a result, in the Rician fading environments in which the direct wave exists as illustrated in FIG. 5A, the estimation methods according to the prior art estimate the mobile station to have the velocity of about 22 km/h to 60 km/h when the incident angle is about $\pi/2$ (i.e., 25 seconds). Consequently, an error occurs up to a maximum 60 km/h. However, the present invention shows an error of about 2 km/h to 3 km/h over the entire interval. Consequently, the present invention shows nearly no error as compared with the prior art.

FIG. 5B shows the result of the simulation experiment of FIG. 4B. As illustrated in FIG. 5B, in the Rayleigh fading environments (B and D portions), the velocity estimation results of the prior art and the present invention show nearly no difference. However, similarly to the case in FIG. 5A, in the Rician fading environments (A, C and E portions), the velocity estimation methods according to the prior art estimate the mobile station to have the velocity of about 35 km/h to 60 km/h. Consequently, an error occurs up to a maximum 45 km/h. However, the present invention shows nearly no error over the entire interval.

FIG. 5C shows the result of the simulation experiment of FIG. 4C. As illustrated in FIG. 5C, in the Rician fading environments (B portion), the velocity estimation methods according to the prior art estimate the mobile station to have the velocity of about 25 km/h to 60 km/h when time is about 25 seconds. Consequently, an error occurs up to a maximum 55 km/h.

From the simulation experiment, the prior art and the present invention show significant difference in the Rician fading environments.

As described above, the present invention proposes a method for estimating a maximum Doppler frequency by means of an M-COV scheme, that is, a method for providing an estimated value without error in Rician fading environments in which a direct wave exists when a velocity of a mobile station is estimated in cellular mobile communication environments. The present invention provides the following advantages.

1. In the in Rician fading environments in which the direct wave exists, the prior art requires a Rician coefficient K, which represents a power ratio of the direct wave and a scattered wave, and information for an incident angle $\theta_0$ of the direct wave in order to perform an estimation without error. However, a maximum Doppler frequency estimation method according to the present invention does not have the necessity of estimating the Rician coefficient and the information for the incident angle. Accordingly, the present invention provides an estimated value without error.

2. The prior art for estimating a velocity by means of an AR coefficient shows little error in the Rician fading environments, but it has an error of about 20% for a specific incident angle and is particularly sensitive to additive noise. However, the present invention shows performance corresponding to that in the conventional method using the ACF and the COV for additive noise. That is, the present invention is less sensitive to noise. In addition, the present invention does not cause any error.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A velocity estimation apparatus in a communication system, in Rician fading environments in which a direct wave exists, including a transmitter for transmitting signals through radio channels and a receiver for receiving the signals and restoring data, the apparatus comprising:

a pilot separation unit for separating a pilot signal from the received signal;

a maximum Doppler frequency estimator for estimating a maximum Doppler frequency by means of the pilot signal output from the pilot separation unit; and a velocity information generator for converting an estimated value of the maximum Doppler frequency estimated by the maximum Doppler frequency estimator into velocity information, wherein the maximum Doppler frequency estimator comprises:

an auto-covariance calculation unit for outputting auto-covariance values by means of the pilot signal; and a maximum Doppler frequency calculation unit for obtaining the maximum Doppler frequency by means of the auto-covariance values output from the auto-covariance calculation unit, wherein the auto-covariance calculation unit comprises:

a first auto-covariance module for performing an auto-covariance operation having a predetermined time difference for the pilot signal, thereby outputting a first auto-covariance value;

a second auto-covariance module for performing an auto-covariance operation without the time difference for the pilot signal, thereby outputting a second auto-covariance value;

a third auto-covariance module for performing an auto-covariance operation without the time difference for a square value of the pilot signal, thereby outputting a third auto-covariance value; and a fourth auto-covariance module for performing an auto-covariance operation having the predetermined time difference for the square value of the pilot signal, thereby outputting a fourth auto-covariance value.

2. The velocity estimation apparatus as claimed in claim 1, wherein the second auto-covariance module comprises:

an instantaneous power calculation unit for calculating an instantaneous power value of the pilot signal; and a first accumulator for accumulating an output value of the instantaneous power calculation unit a predetermined number of times, thereby outputting the second auto-covariance value.

3. The velocity estimation apparatus as claimed in claim 1, wherein the third auto-covariance module comprises:

an instantaneous power calculation unit for calculating an instantaneous power value of the pilot signal;

a second accumulator for accumulating a square value of an output value of the instantaneous power calculation unit a predetermined number of times; and a third auto-covariance calculation unit for outputting the third auto-covariance value by means of the second auto-covariance value and an output value of the second accumulator.

4. The velocity estimation apparatus as claimed in claim 1, wherein the fourth auto-covariance module comprises:
an instantaneous power calculation unit for calculating an instantaneous power value of the pilot signal;
a third accumulator for accumulating a value a predetermined number of times, which is obtained by squaring difference between an output value of the instantaneous power calculation unit and a value having a predetermined time difference for the output value; and
a fourth auto-covariance calculation unit for obtaining the fourth auto-covariance value by means of an output value of the third accumulator and the third auto-covariance value.

5. A velocity estimation method in a communication system, in Rician fading environments in which a direct wave exists, including a transmitter for transmitting signals through radio channels and a receiver for receiving the signals and restoring data, the method comprising the steps of:
separating a pilot signal from the received signal;
calculating a movement velocity of the receiver by means of the separated pilot signal;
estimating a maximum Doppler frequency by means of the pilot signal;
converting the estimated maximum Doppler frequency into velocity information;
performing an auto-covariance operation for the pilot signal; and
obtaining the maximum Doppler frequency by means of auto-covariance values calculated through the auto-covariance operation, wherein the step of calculating the auto-covariance values comprises:
performing an auto-covariance operation having a predetermined time difference for the pilot signal, thereby calculating a first auto-covariance value;
performing an auto-covariance operation without the time difference for the pilot signal, thereby calculating a second auto-covariance value;
performing an auto-covariance operation without the time difference for a square value of the pilot signal, thereby calculating a third auto-covariance value; and
performing an auto-covariance operation having the predetermined time difference for the square value of the pilot signal, thereby calculating a fourth auto-covariance value.

6. The velocity estimation method as claimed in claim 5, wherein the step of calculating the first auto-covariance value uses a real part and an imaginary part of the pilot signal.

7. The velocity estimation method as claimed in claim 5, wherein the step of calculating the second auto-covariance value comprises:
calculating an instantaneous power value of the pilot signal; and
accumulating the instantaneous power value of the pilot signal a predetermined number of times, thereby obtaining an auto-covariance value without the time difference for the pilot signal.

8. The velocity estimation method as claimed in claim 7, wherein the step of calculating the third auto-covariance value comprises:
calculating the instantaneous power value of the pilot signal;
accumulating the instantaneous power value of the pilot signal a predetermined number of times; and
obtaining the third auto-covariance value by means of the second auto-covariance value and a result value from the accumulation of the instantaneous power value,
wherein the third auto-covariance value is an auto-covariance value without the time difference for a square value of the pilot signal.

9. The velocity estimation method as claimed in claim 5, wherein the step of calculating the fourth auto-covariance value comprises:
calculating an instantaneous power value of the pilot signal;
accumulating a value a predetermined number of times, which is obtained by squaring difference between the instantaneous power value and a power value having a predetermined time difference for the instantaneous power value; and
obtaining the fourth auto-covariance value by means of the third auto-covariance value and a result value from the accumulation of the value,
wherein the fourth auto-covariance value is an auto-covariance value having the predetermined time difference for a square value of the pilot signal.

10. The velocity estimation method as claimed in claim 5, wherein the maximum Doppler frequency is calculated by an below $$f_m = \frac{1}{2\pi\tau} J_0^{-1}\left(\frac{c_x(\tau) - \sqrt{c_x^2(\tau) - c_{|x|^2}(\tau)}}{c_x(0) - \sqrt{c_x^2(0) - c_{|x|^2}(0)}}\right),$$

wherein $f_m$ represents the maximum Doppler frequency, $J_0(\cdot)$ represents a zero order Bessel function of a first kind, $c_x(0)$ represents an auto-covariance value without a time difference for a received signal, $c_x(\tau)$ represents an auto-covariance value having a time difference $\tau$ for the received signal, $c_{|x|^2}(0)$ represents an auto-covariance value without a time difference for a square value of the received signal, and $c_{|x|^2}(\tau)$ represents an auto-covariance value having the time delay $\tau$ for the square value of the received signal.

* * * * *